US012574125B2

(12) United States Patent
Basavarajappa

(10) Patent No.: US 12,574,125 B2
(45) Date of Patent: Mar. 10, 2026

(54) SMART OTA ANTENNA

(71) Applicant: DISH Network Technologies India Private Limited, Bangalore (IN)

(72) Inventor: Rajashekhar Mandlur Basavarajappa, Bengaluru (IN)

(73) Assignee: DISH Network Technologies India Private Limited, Bangalore (IN)

( * ) Notice: Subject to any disclaimer, the term of this patent is extended or adjusted under 35 U.S.C. 154(b) by 475 days.

(21) Appl. No.: 16/821,847

(22) Filed: Mar. 17, 2020

(65) Prior Publication Data

US 2021/0297166 A1     Sep. 23, 2021

(51) Int. Cl.
| | |
|---|---|
| *H04B 17/16* | (2015.01) |
| *H01Q 1/22* | (2006.01) |
| *H01Q 1/24* | (2006.01) |
| *H04B 17/318* | (2015.01) |

(52) U.S. Cl.
CPC ............. *H04B 17/16* (2015.01); *H01Q 1/225* (2013.01); *H01Q 1/243* (2013.01); *H04B 17/318* (2015.01)

(58) Field of Classification Search
CPC ...... H04B 17/16; H04B 17/318; H01Q 1/225; H01Q 1/243
See application file for complete search history.

(56) References Cited

U.S. PATENT DOCUMENTS

| | | | | | |
|---|---|---|---|---|---|
| 10,506,452 | B2 * | 12/2019 | Lee | ........................ | H04B 7/086 |
| 2010/0177000 | A1 * | 7/2010 | Brisebois | ............. | H01Q 1/1257 |
| | | | | | 343/703 |

| | | | | | |
|---|---|---|---|---|---|
| 2011/0023074 | A1 * | 1/2011 | Nguyen | ............... | H04B 17/318 |
| | | | | | 725/151 |
| 2011/0298672 | A1 * | 12/2011 | Otto | ......................... | H01Q 3/08 |
| | | | | | 343/894 |
| 2016/0161942 | A1 * | 6/2016 | Linderer | ................ | G05B 24/02 |
| | | | | | 318/600 |
| 2017/0098889 | A1 * | 4/2017 | Henry | ........................ | H01P 3/16 |
| 2017/0318353 | A1 * | 11/2017 | Petruzzelli | ......... | H04N 21/4263 |
| 2018/0323834 | A1 * | 11/2018 | Jiang | .......................... | G01S 3/40 |
| 2019/0036224 | A1 * | 1/2019 | Mccollough | ........... | H01Q 5/321 |
| 2019/0123433 | A1 * | 4/2019 | Lee | ...................... | H01Q 1/3233 |
| 2019/0361105 | A1 * | 11/2019 | Kim | ...................... | G01S 13/343 |
| 2021/0111821 | A1 * | 4/2021 | Petruzzelli | ............ | H04W 4/025 |
| 2021/0126723 | A1 * | 4/2021 | Foster | ................... | H04B 17/11 |
| 2021/0227396 | A1 * | 7/2021 | Khalid | .................. | H04W 16/28 |

* cited by examiner

*Primary Examiner* — Junpeng Chen
(74) *Attorney, Agent, or Firm* — Perkins Coie LLP

(57)     ABSTRACT

Techniques are described for an antenna (e.g., an over the air (OTA) antenna) to be intelligently configured so as to adjust itself according to dynamic parameters, such as weather changes. Mechanisms are described that enable the end user to set preferences data (e.g., preferred channels) so that the OTA antenna automatically adjusts its placement to satisfy these preferences (e.g., to catch some preferred channels and with the highest quality available). Also described are techniques that include artificial intelligence (AI) and/or machine learning (ML) for learning the end user's patterns (e.g., patterns of viewership) and, subsequently, automatically adjusting the OTA antenna's position in accordance with the learned patterns. For example, the system may steer the OTA antenna to catch the best signal strength of a favorite channel of an end user, so that the end user can watch that channel with the highest quality, without any hassles, and at any time.

17 Claims, 5 Drawing Sheets

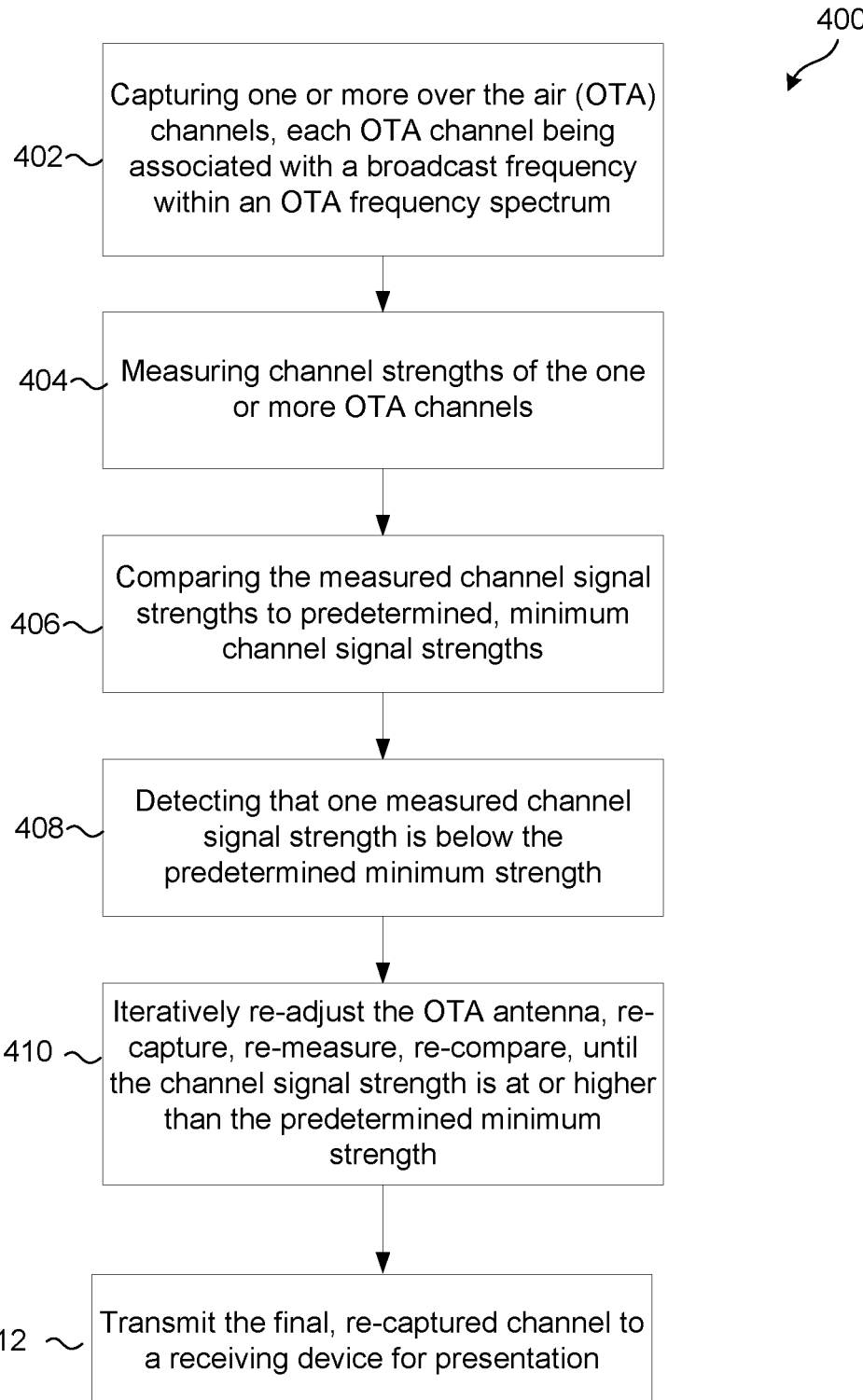

402~ Capturing one or more over the air (OTA) channels, each OTA channel being associated with a broadcast frequency within an OTA frequency spectrum 404~ Measuring channel strengths of the one or more OTA channels 406~ Comparing the measured channel signal strengths to predetermined, minimum channel signal strengths 408~ Detecting that one measured channel signal strength is below the predetermined minimum strength 410 ~ Iteratively re-adjust the OTA antenna, re-capture, re-measure, re-compare, until the channel signal strength is at or higher than the predetermined minimum strength 412 ~ Transmit the final, re-captured channel to a receiving device for presentation

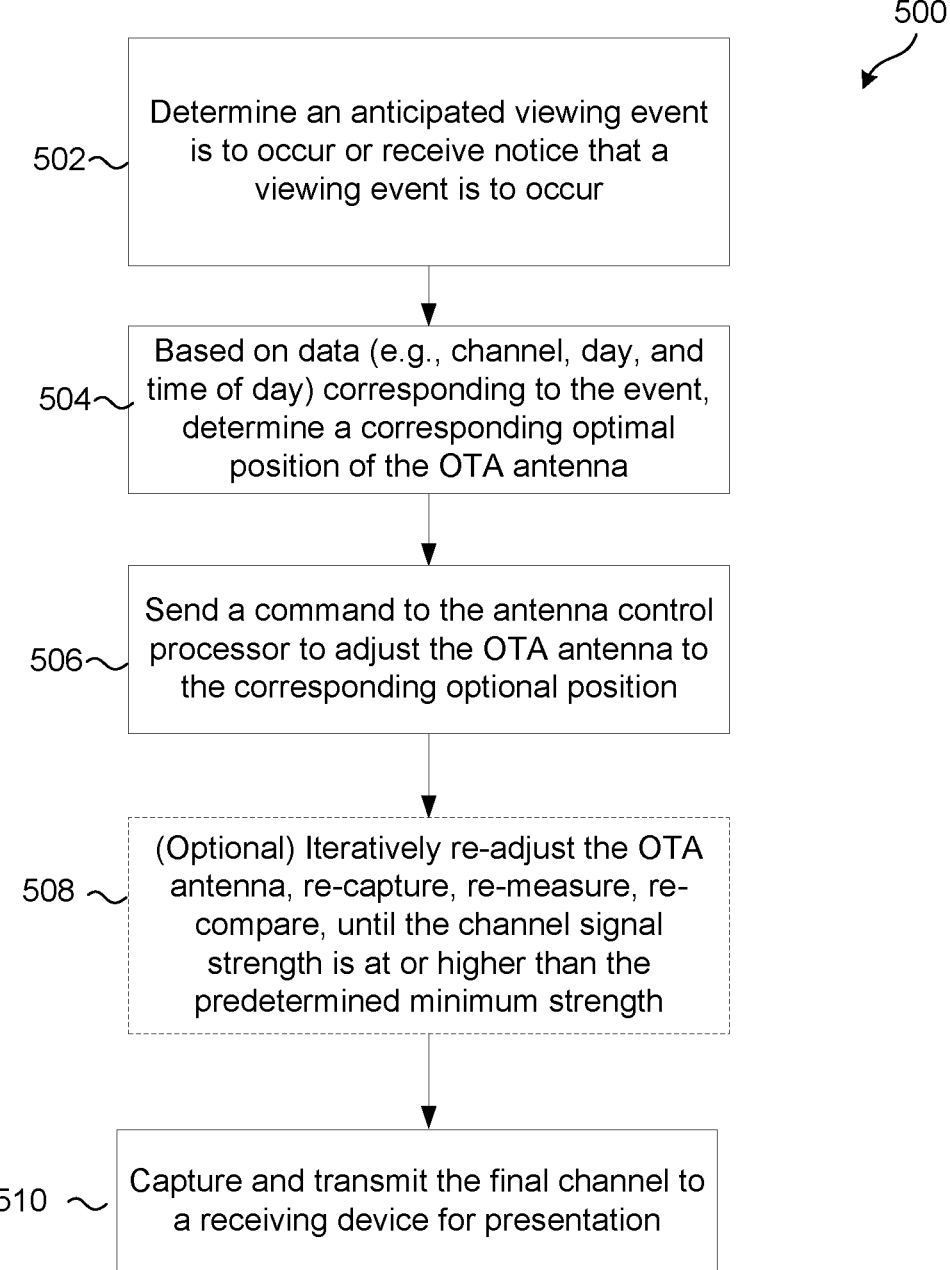

502 — Determine an anticipated viewing event is to occur or receive notice that a viewing event is to occur 504 — Based on data (e.g., channel, day, and time of day) corresponding to the event, determine a corresponding optimal position of the OTA antenna 506 — Send a command to the antenna control processor to adjust the OTA antenna to the corresponding optional position 508 — (Optional) Iteratively re-adjust the OTA antenna, re-capture, re-measure, re-compare, until the channel signal strength is at or higher than the predetermined minimum strength 510 — Capture and transmit the final channel to a receiving device for presentation

*FIG. 5*

SMART OTA ANTENNA

BACKGROUND

Over the air (OTA) television is a term used to describe free to air television signals broadcast by local television broadcast towers (e.g., as opposed to a satellite signal). An OTA antenna is used to receive OTA signals from such broadcast towers. Several factors affect the quality of reception such OTA signals by an OTA antenna installed at a building, including the distance of the broadcast tower from the OTA antenna, the direction of the broadcast tower, the height at which the OTA antenna is installed, the type of OTA antenna installed, whether there is a Long term evolution (LTE) interference, whether a preamplifier is required, etc. After installation, when the reception is considered of poorer quality to an end user, they sometimes manually adjust the antenna (e.g., change angle) for the antenna to receive a better quality signal (e.g., until the television tunes to the right channel with acceptable quality).

BRIEF DESCRIPTION OF THE DRAWINGS

FIG. 4 is a flow diagram showing a method for a smart OTA antenna to adjust itself, in accordance with an embodiment.

FIG. 5 is a flow diagram showing smart OTA pre-positioning and/or redirection based on either anticipated or observed events, in accordance with an embodiment.

DETAILED DESCRIPTION

Figure 1:
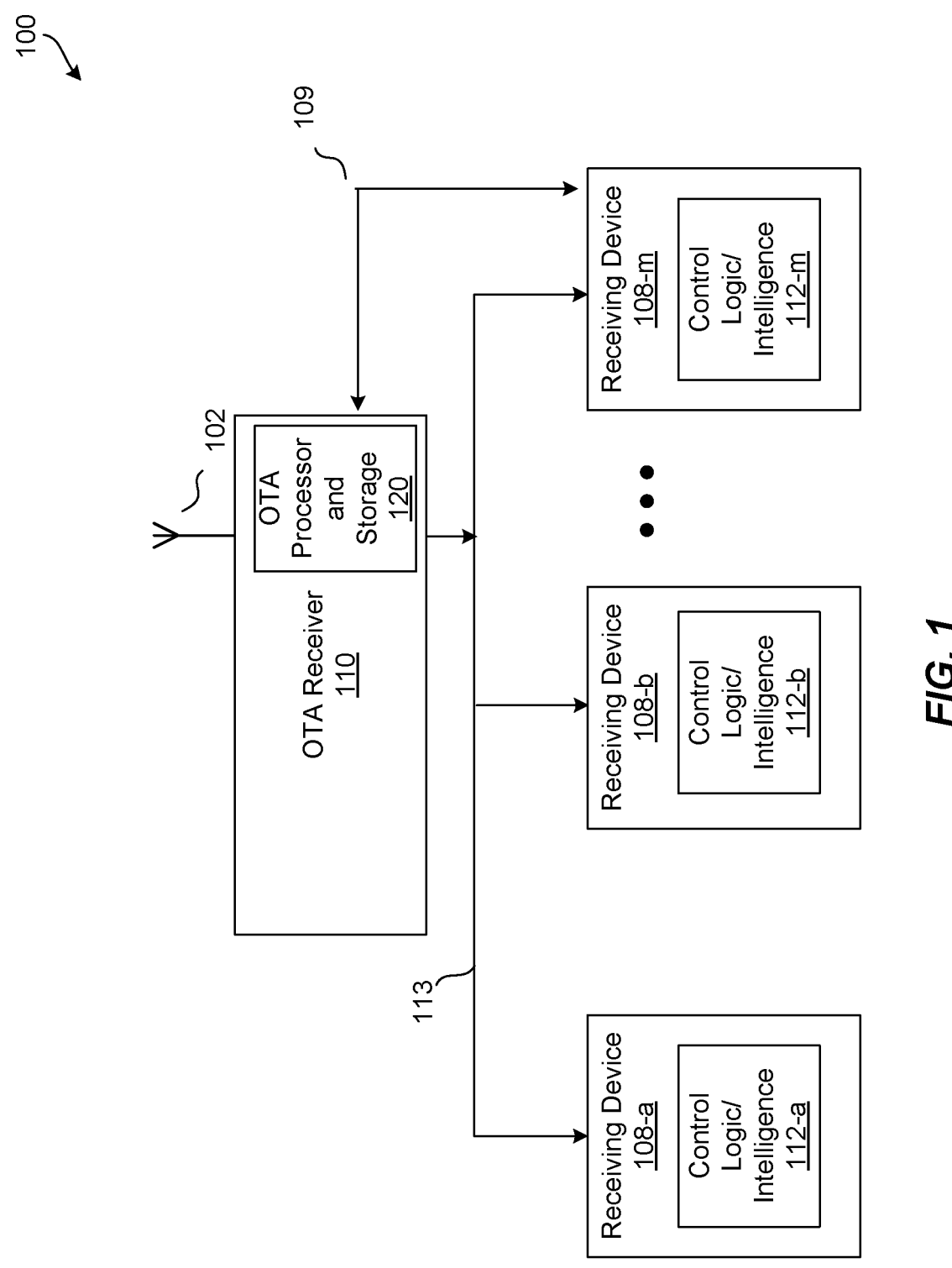
FIG. 1 is a block diagram of a television receiving system, in accordance with an embodiment.

Presently, and as may be known, many viewers of free, over the air (OTA) channels face signal issues, e.g., due to the antenna placement and, sometimes, weather changes. To rectify such situations, typically, users manually adjust their OTA antenna and perform a re-scan operation for the OTA channels. Thus, it would be an improvement over current practices to provide a smart OTA antenna, which adjusts its position, angle, and/or direction, itself, to effectively always have the best signal reception for the viewer's OTA channels. In addition, it should be appreciated that the innovative techniques described herein may be extended to or applied to other types of antennas, which are installed to capture signals.

Thus, techniques are described herein for an antenna (e.g., an OTA antenna) to be configured to intelligently adjust itself according to dynamic parameters, such as, for example, to changes in weather. Also, mechanisms are described that enable the end user, e.g., the viewer of a television, to set preferences data (e.g., their preferred channels) so that the OTA antenna automatically and dynamically adjusts its placement to satisfy these preferences (e.g., to capture the preferred channels, with the highest quality available). Also described are techniques that employ artificial intelligence (AI) and machine learning (ML) to learn the end user's viewing patterns and, subsequently, automatically adjusting the OTA antenna's position to reflect the learned patterns. For example, the system may automatically steer the OTA antenna to capture the best signal strength of the favorite channel(s) of the end user, so that the end user may watch that channel(s) with the highest quality available, without any hassle, and at any time.

For purposes of understanding, antennas may be available in many shapes and sizes. As well, an antenna may be an indoor or an outdoor antenna and may and directional or multidirectional. Some antennas come with an amplifier that amplifies the signal received by the antenna before processing and forwarding the signal for its intended purpose. Typically, the position of an outdoor antenna may be configured or positioned in such a way so that the broadcasted signal may be received by the outdoor antenna with having the best quality or strength. Such outdoor antenna may be mounted on the roof of a building (e.g., a house) with a cable attached to the desired television (TV) or set-top-box.

Currently, end users may install their OTA antenna and then position it (e.g., move, change angle, etc.) until the TV in another room receives the desired or intended channels. As well, the end user may scan for desired channels on their TV, according to the setting of the specific TV. This way, the TV learns which frequencies are mapped to which channels. In some embodiments, a home may have two (or more) TVs and an OTA antenna for each TV.

In some embodiments, streaming box type devices are employed to function as a streaming box. For example, AirTV (Dish Network (Englewood, Colorado) is an example of a device that may stream free TV signals. Further, AirTV may be communicably connected with Wi-Fi and may stream OTA channels wirelessly to one or more streaming boxes at a vicinity.

It should be appreciated that the term "signal" may be any digital or analog signal. Those signals may include, but are not limited to, a bit, a specified set of bits, an AC signal, or a DC signal. Uses of the term "signal" in the description may include any of these different interpretations. It will be understood to one skilled in the art that the term "connected" is not limited to a physical connection but can refer to any means of communicatively or operatively coupling or connecting two devices.

The disclosure may use the terms "television converter," "receiver," "receiving device," "television receiver," "television recording device," "set-top box (STB)", "satellite set-top box," "satellite receiver," "cable set-top box," "cable receiver," and "television tuner" to refer interchangeably to a converter device or electronic equipment that has the capacity to acquire, process and distribute one or more signals transmitted by broadcast, cable, telephone, or satellite distributors. DVR and "personal video recorder (PVR)" refer interchangeably to devices that can record and play back signals and that may implement trick functions including, but not limited to, fast-forward, rewind and pause. DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top boxes.

The term "television" refers to a television set or video display that may contain an integrated television converter device (e.g., an internal cable-ready television tuner housed inside a television) or, alternatively, that is connected to an external television converter device (e.g., an external set-top box connected via cabling to a television).

The term "transponder" is used herein to denote a particular carrier frequency or "sub-band" which can be tuned to by an appropriate tuner. In particular, note that "transponder" does not refer to a single program/content service (e.g., CNN®, HBO®, CSPAN®). Similarly, "tuning" herein refers to receiving a transponder (as previously defined) or an over-the-air (OTA) broadcast television channel. The transponder or OTA channel may have multiple services thereon.

An embodiment may be understood with reference to FIG. 1, a block diagram of a television receiving system 100. An OTA receiver 110 receives OTA broadcast television signals using one or more OTA antennas 102. The OTA antennas 102 may be controllable by the OTA receiver 110. For example, the OTA receiver 110 may select certain antennas 102 to receive an OTA signal, and/or steer certain antennas 102 to improve the quality of received signals. The received OTA signals may include a set of OTA channels carrying one or more video streams. The video streams may be digital television (DTV) streams. Each OTA channel may correspond to a broadcast frequency within an OTA frequency spectrum.

The OTA receiver 110 allows the selected OTA channels to be transmitted on coaxial feed 113 to one or more receiving devices 108a, 108b, through 108m. In an embodiment, the OTA receiver 110 adds signals to a channel stack. The channel stack may then be transmitted as a coaxial feed 113 to the receiving devices 108a-108m. Techniques for adding signals to a channel stack are described in U.S. application Ser. No. 13/558,175, filed Jul. 25, 2012, which is incorporated by reference herein in its entirety. It should be appreciated that in an embodiment, OTA receiver 110 may be incorporated with receiving device 108 (i.e., one or more receiving devices 108a, 108b, through 108m).

In order to process the streams included in the coaxial feed 113, each receiving device 108a-108m tunes a transponder or an OTA channel from the coaxial feed 113, demodulates the signal, demultiplexes out a desired video stream, decompresses it from MPEG-4 (e.g., from HEVC H.265, H.264/MPEG-4 Part 10 or "Advanced Video Coding" (AVC)) or other compression format (e.g., MPEG-2, H.263, VC-1, VC-2 (Dirac), Windows Media Video (WMV), RealVideo, Theora, TrueMotion VP3, etc.) and reformats it into the appropriate video specification (e.g., National Television Standards Committee (NTSC), Phase Alternate Lines (PAL), and High-Definition Multimedia Interface (HDMI), etc.). Each receiving device 108a-108m may then output a video signal, as appropriate, to a display device or other devices. The OTA receiver 110 may process video streams from the selected OTA channels and convert the video streams into Multimedia over Coax Alliance (MoCA) signals. The MoCA signals may then be transmitted over the coaxial feed 113.

The receiving devices 108a-108m include one or more tuner/demodulators that receive and process the coaxial feed 113. The tuner/demodulators may tune to the OTA channels from the coaxial feed 113. The tuner/demodulators of the receiving devices 108a-108m may initially process the coaxial feed 113 and also may receive user commands to tune to an OTA channel as part of the process of selecting a certain video stream for viewing on a display device. Such tuner/demodulators may include fewer, more, or different components. Alternatively or in addition, the receiving devices 108a-108m may include a communications module for receiving Multimedia over Coax Alliance (MoCA) signals from the coaxial feed 113. Video streams may then be decoded from the MoCA signals. Also, the receiving devices 108a-108m may perform other functions and be connected to fewer or more devices. One skilled in the art will recognize that many embodiments of the receiving devices 108a-108m are possible and within the scope of this disclosure.

In an embodiment, the receiving devices 108a-108m may transmit a control command to the OTA receiver 110 to adjust the antenna 102. The receiving devices 108a-108m may transmit the command over the coaxial feed 113 or over a wireless technology 109, such as, for example, the wireless transmission protocol known as Bluetooth (Bluetooth SIG, Inc.).

In an embodiment, the OTA receiver 110 may include an intelligent component (not shown, but discussed in further detail below) that measures the incoming signal strength against a target and, based on the measurement, may automatically adjust itself to capture the same type of signal, but with improved signal strength.

In another embodiment, the receiving devices 108a-108m may include an intelligent component, e.g., OTA Processor and Storage 120, discussed in further detail below, that stores the end user's channel preferences (e.g., including date and time) and that measures the quality of the channel signal (e.g., the signal strength of the channel). This component is configured to compare the measured quality to a known (e.g., stored), predetermined quality. When the measured quality is below a certain threshold, the component is configured to send a command to the OTA receiver 110 to adjust the antenna 102, until a signal with improved quality is received. The command may be transmitted via the coaxial feed 113 or via the wireless technology 109. In the embodiment, the OTA receiver 110 has a receiving component (not shown, but discussed in further detail below) that is configured to receive commands from the receiving devices 108a-108m to adjust the antennas 102 and to then adjust the antennas 102.

In another embodiment, the receiving devices 108a-108m may include a control logic/intelligence component 112a-112m, discussed in further detail below, that are configured to perform AI or ML, to learn the end user's viewing patterns. It should be appreciated that the receiving devices 108a-108m may also be communicably connected to AI or ML algorithms via a network, rather than house the algorithms on site. This component may be configured to learn when programs are going to be viewed and to automatically send a command to the OTA receiver 110 to adjust the antenna 102 until an acceptable signal (e.g., on or above the predetermined minimum signal strength) is captured. Also, the AI or ML may prepare the channel signal strengths for a multiple set of channels, which have been learned that the end used typically watches and within a time frame. For example, in the morning, the AI or ML component may determine that the user likes to watch the news on a particular channel at a specific time. Thus, before that time and optionally intermittently during the viewing time, the receiving devices 108a-108m may send the appropriate command to the OTA receiver 110 to capture the optimal signal for the multiple channels. Then, the OTA receiver 110 adjusts the antenna 102. Then, to continue with the example, in the evening, the AI or ML component may determine that the user likes to watch sports on the sports channel at a specific time. Thus, before such time that the user watched the sports channel and optionally intermittently during the viewing time, the receiving devices 108a-108m may send the appropriate command to the OTA receiver 110 to capture the optimal signal for the multiple channels. Then, the OTA receiver 110 adjusts the antenna 102.

In an embodiment, some inputs to the ML algorithms may include the channels that are watched, time at which the each channel was being viewed, the duration of the viewing time of each channel, any associated profile with each channel, the various signal strengths during the time which each channel was being watched. The learning process stores such collected input over a predetermined period of time. The data is prepared appropriately, depending on the model chosen that is appropriate for predicting when a particular channel will be watched at a particular time and for what duration. An appropriate training process is initiated and repeated or iterated, continually updating the weights of the model. The model is tested and then tuned, as necessary. As the number of input data increases, the accuracy of the model improves. Example outputs of the MI process may include commands to specifically position the corresponding antenna appropriately. Outcomes may vary from a specific position to an acceptable or predetermined range of positions (e.g., move the antenna to the left about ½-1 centimeter).

Figure 2:
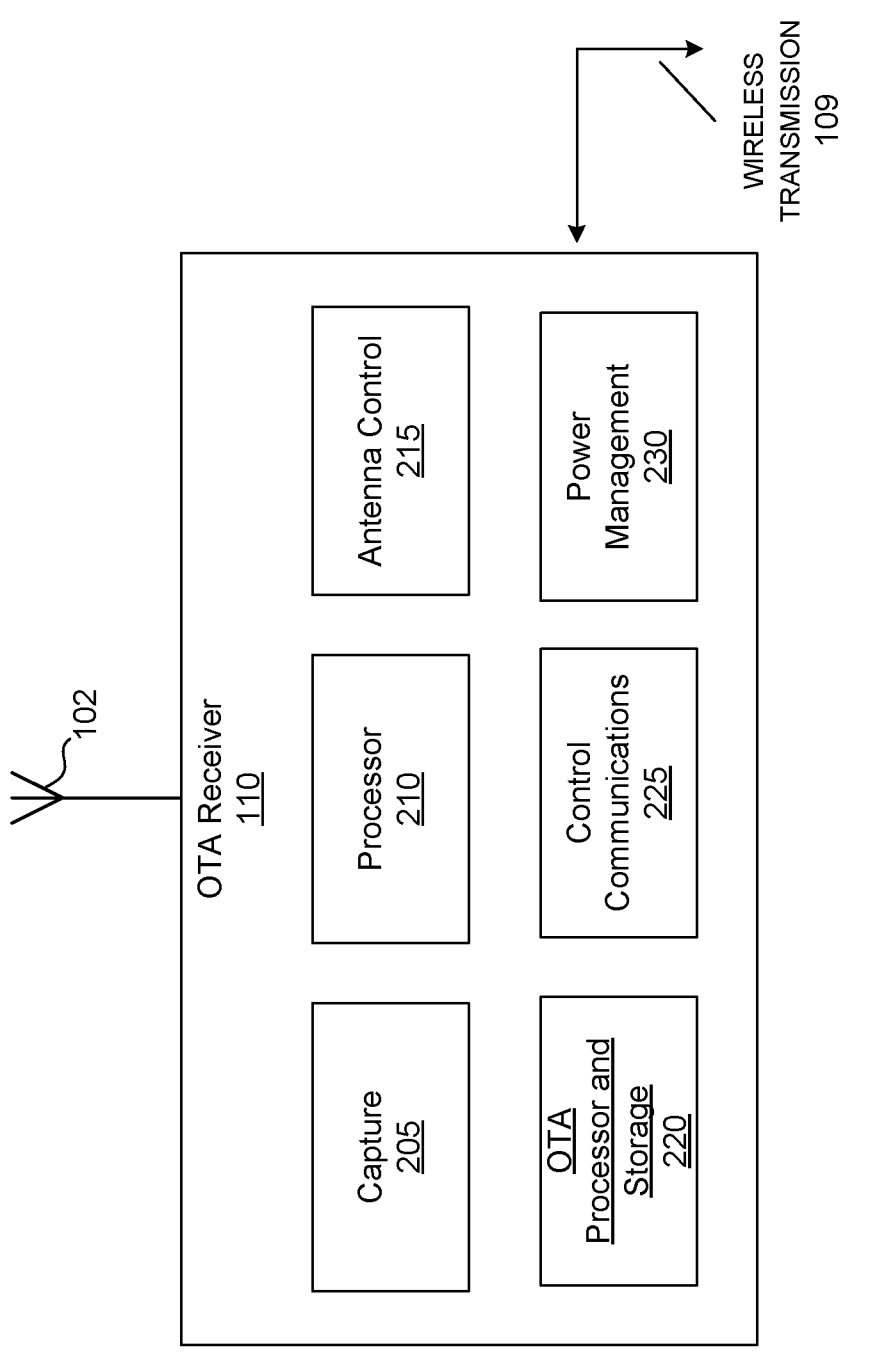
FIG. 2 is a block diagram of an OTA receiver, in accordance with an embodiment.

FIG. 2 is a diagram illustrating an example of an OTA receiver 110. The OTA receiver 110 may be an example of the OTA receiver 110 described in reference to FIG. 1. The OTA receiver 110 may include one or more OTA antennas 102. The OTA receiver 110 may be a component of a satellite receiver antenna, a LNBF of a receiver antenna, or a receiving device. Alternatively, the OTA receiver may be a stand-alone component.

The OTA receiver 110 may include a capture module 205, a processor module 210, an antenna control module 215, an OTA processor and storage module 220, a control communications module 225, and a power management module 230.

The capture module 205 receives signals in the OTA frequency spectrum from the antenna 102 and captures the signals. The capture module 205 may perform analog to digital conversion of the entire OTA frequency spectrum. Alternatively, the capture module may utilize a bank of tuner/demodulators tuned to each frequency band of the OTA frequency spectrum.

The processor module 210 may then select certain OTA channels from the captured OTA frequency spectrum. The OTA channels may be selected based on which OTA channels are being tuned to by one or more of the receiving devices. Alternatively or in addition, the OTA channels may be selected based on a user's viewing history or other user preferences. The processor module 210 may include a firmware and other memory to store the operations of the OTA receiver 110. The OTA channels that are to be selected by the processor module 210 may be communicated to the OTA receiver 110 from a receiving device through the control communications module 225.

In some embodiments, the OTA receiver 110 further includes an antenna control module 215. The antenna control module 215 may allow the OTA receiver 110 to switch between multiple antennas 102 and/or steer one or more antennas 102. By switching and/or steering the antennas 102, the antenna control module 215 may optimize the antennas' reception of certain OTA channels in the OTA frequency spectrum. For example, the antenna control module 215 may switch to an antenna 102 that receives a stronger signal for one of the selected OTA channels.

In some embodiments, the OTA processor and storage module 220 may be configured to measure signal strength, determine that such signal strength is below a minimum signal strength, and send a command to the antenna control module 215 to adjust its position with the intent of receiving a comparatively better signal strength for the channel in question. In an embodiment, the OTA processor and storage module 220 stores predefined minimum signal strengths for corresponding channels. In an embodiment, the OTA processor and storage module 220 may load into memory an AI or ML algorithm for learning when, the duration of, and acceptable strengths of specific channel signals captured by the OTA antennas 102 and OTA Receiver 110 (e.g., capture module 205) over time. It should be appreciated that in an embodiment, OTA processor and storage module 220 may be incorporated as a component of processor 210. In an embodiment, the measurement of signal strength may result in a directional change of the OTA (e.g., OTA 102). For example, the rain fade or other environmental conditions may diminish the quality of the received signal, resulting in the OTA to move to better tune a substitute channel or frequency.

In an embodiment, the OTA processor and storage module 220 may be configured with a receiving component for receiving commands from the receiving devices 108a-108m to adjust the antennas 102 and to send the appropriate command to the antenna control module 215 to adjust the antennas 102. It should be appreciated that the receiving component of the OTA receiver 110 may be a separate and distinct component or may be incorporated into other modules of the OTA receiver 110.

The control communications module 225 may receive control communications from a receiving device via a coaxial cable using protocols such as Digital Satellite Equipment Control (DiSEqC) or Frequency Shift Keying (FSK). In some embodiments, the firmware of the OTA receiver 110 may also be updated through communications received by the control communications module 325 via the coaxial cable 113. As well, in some embodiment, the firmware of the OTA receiver 110 may also be updated through communications received by the control communications module 325 via the wireless connection 109.

Once the particular OTA channels are selected from the captured OTA frequency spectrum, the processor module 210, the processor module 210 may measure the signal strengths of one or more of the channels and compare them with a stored predetermined values of minimum strengths for each of the channels. The processor module 210 can be further configured to send a command to the antenna control 215 module to adjust the antenna 102 in an iterative manner until the captured signal strength is above the acceptable minimum.

The power management module 230 receives power from an external source, then conditions and distributes the power to the various modules and components of the OTA receiver 110. In some embodiments, the power management module 230 may receive power from receiving devices through a coaxial cable connection.

In some embodiments, the OTA receiver 110 may include additional control circuitry and modules. For example, the OTA receiver 110 may include switchable filters, switchable low noise amplifiers (LNAs), and/or switchable line amplifiers. The switchable filters may reduce interference of the OTA channels received by the antennas 102. The switchable LNAs may increase the signal power of OTA channels received by the antenna 102.

Figure 3:
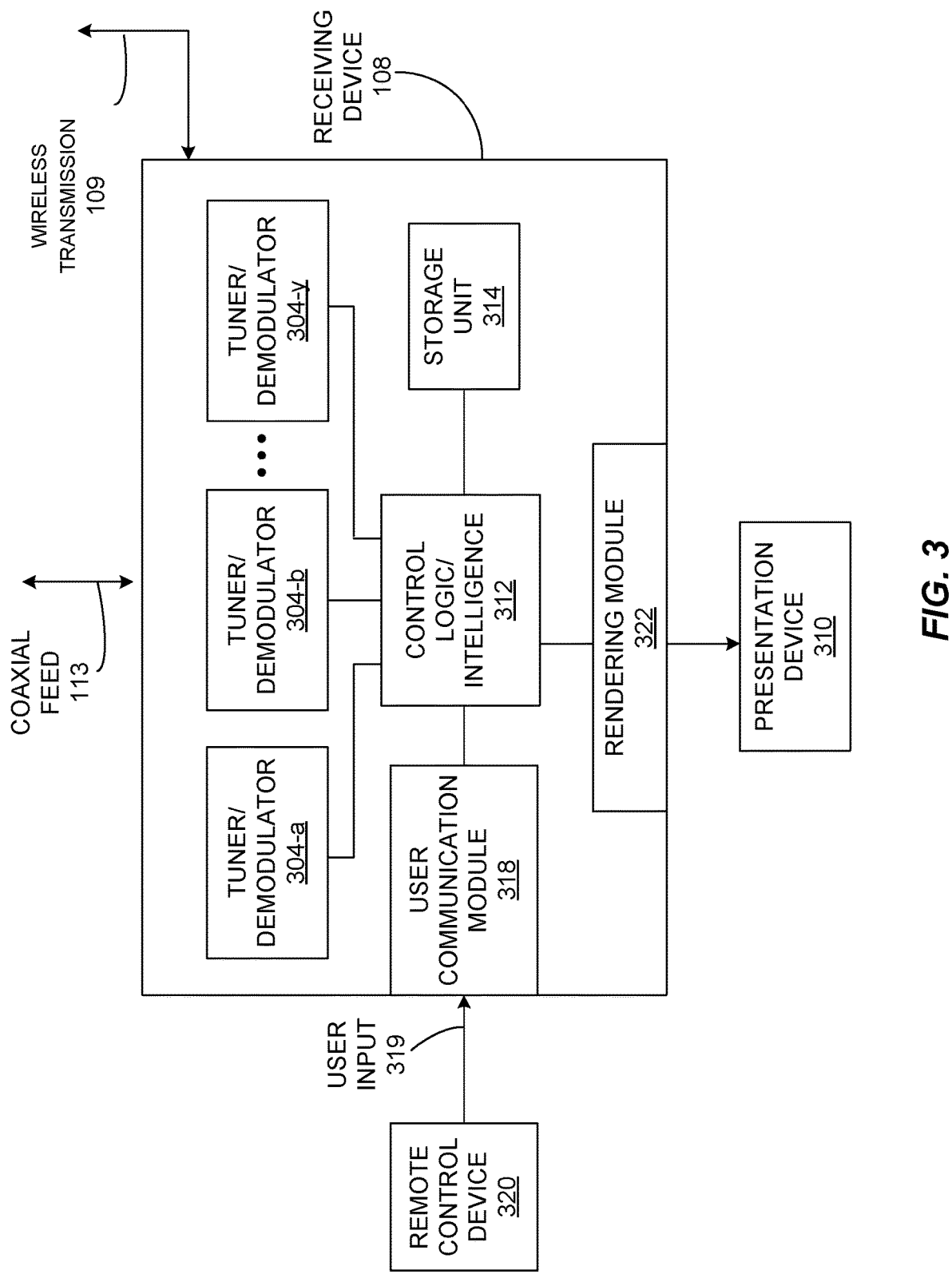
FIG. 3 is a block diagram of a receiving device, in accordance with an embodiment.

FIG. 3 illustrates an example of a receiving device 108, according to one non-limiting illustrated embodiment. The receiving device 108 may be an example of one or more of the receiving devices 108a-108m described in reference to FIG. 1.

The receiving device 108 includes one or more tuner/demodulators 304a-304y. Each tuner/demodulator 304a-304y may tune and process one or more channels and/or transponder signals from a coaxial feed 113. While shown as individual tuner/demodulators 304a-304y, the receiving device 108 may include one or more wideband tuner/demodulators, each capable of tuning and demodulating multiple channels and/or transponders from the coaxial feed 113. The coaxial feed 113 may be an example of the coaxial feed described in reference to FIG. 1.

In an embodiment, the receiving device 108 includes a MoCA communication module (not shown) for receiving MoCA signals from the coaxial feed 113. The MoCA signals included in the coaxial feed 113 may correspond to MoCA signals transmitted by the OTA receiver 110, as described in reference to FIG. 1.

The tuner/demodulators 304a-304y may tune to a particular channel or transponder as part of the process of a user selecting a certain content stream for viewing on a presentation device 310. A control logic/intelligence module 312 may identify which channel or transponder of the coaxial feed 313 includes a selected content stream and instruct the corresponding tuner/demodulator to tune and demodulate the channel or transponder. The control logic/intelligence 312 may identify which channel or transponder should be tuned and demodulated based on a mapping of content streams to channels and transponders. Once a channel or transponder signal has been tuned and demodulated, the control logic/intelligence 312 may extract the selected content stream.

One or more storage units 314 may be included internal and/or external to the receiving device 108. The storage unit 314 may store recorded content streams and/or other control or informational data, such as the channel and/or transponder mapping. The control logic/intelligence 312 may coordinate the storage and retrieval of content streams or other data to/from the storage unit 314.

The receiving device 108 may also include a user communication module 318 and a rendering module 322. The user communication module 318 receives user input 319 from a remote control device 320. The rendering module 322 renders a content stream into a presentable format for the presentation device 310. The control logic/intelligence 312 may coordinate the output of a video stream to the rendering module 322. Furthermore, the receiving device 108 may include other components, modules, elements, or devices not illustrated for the sake of brevity.

In an embodiment, the control logic/intelligence module 312 may be configured to measure the signal strengths of one or more of the channels arriving via coaxial feed 113 and compare such signal strengths with a stored (e.g., in storage unit 314) predetermined values of minimum strengths for each of the channels. The control logic/intelligence module 312 may be further configured to send a command (e.g., via wireless transmission 109) intended for the antenna control 215 module of the OTA receiver 110, to adjust the antenna 102 until the captured signal strength is above the acceptable minimum. In an embodiment, this process is performed iteratively until an acceptable strength (e.g., greater than the predefined minimum strength) is captured.

Thus, with the control logic/intelligence module 312, the intelligence knows at a particular time, a user watches particular channels (e.g., ABC or CBS). Then, the next day, at the same time, the software and/or control will adjust the antenna to receive the best signal strength for these channels at the same time of day. The AI/ML software is a continuous learning engine which learns the user's pattern, e.g., how much time channels were watched and how much signal strength the channels had.

In an embodiment, the control logic/intelligence module 312 may be configured to learn when programs are going to be viewed and to automatically send a command to the OTA receiver 110 (e.g., via wireless transmission 109) to adjust the antenna 102 until an acceptable signal (e.g., on or above the predetermined minimum signal strength) is captured. Also, the AI or ML can prepare the channel signal strengths for a multiple set of channels that have been learned that the end used typically watches and within a time frame. For example, in the morning, the AI or ML component may determine that the user likes to watch the news on a particular channel at a specific time. Thus, before that time and optionally intermittently during the viewing time, the receiving devices 108a-108m may send the appropriate command to the OTA receiver 110 to capture the optimal signal for the multiple channels. Then, the OTA receiver 110 adjusts the antenna 102. Then, to continue with the example, in the evening, the AI or ML component may determine that the user likes to watch sports on the sports channel at a specific time. Thus, before such time that the user watched the sports channel and optionally intermittently during the viewing time, the receiving devices 108a-108m may send the appropriate command to the OTA receiver 110 to capture the optimal signal for the multiple channels. Then, the OTA receiver 110 adjusts the antenna 102.

In an embodiment, the control logic/intelligence module 312 comprises an AI/ML module that comprises algorithms capable of 'learning' from existing data and discovering hidden patterns in new data. The AI/ML module may classify and optimize user profiles, identifying when a particular channel will be viewed. The AI/ML module may operate in real time in analyzing incoming channel signals.

In an embodiment, the system may compile user profiles, e.g., stored in the storage unit 314, which evolve over time, learning more about the user's viewing habits or patterns as time goes on and thereby enabling personalization of the system to better fulfill the user needs.

In an embodiment, the AI/ML module may analyze patterns in current and/or historical viewing data. The innovative system learns over time who watches, what is watched, when the channel is watched, and for what duration. Then, based on this data, the antenna 102 positions itself to get the strongest signal for the specific channels (e.g., via processes as described herein).

In an embodiment, the AI/ML module may utilize a variety of ML algorithms, such as, e.g. similarity metrics or collaborative filtering, that may result in commands transmitted (e.g., via the wireless transmission 109) intended for the antenna control module 215 to adjust the antenna 102, thereby being adapted to the user's needs. Such ML algorithms may be described broadly as classification, or pattern matching, systems that identify the features specific to the user's viewership and ultimately determine that the antenna 102 needs adjusting.

In an embodiment, the user may manually force a rescan (e.g., from remote control device 320) and the control (e.g., control logic/intelligence 312) does not disturb the user nor interrupt the user's viewing experience. The forced rescan command may induce the needed rotation of antenna, etc. For example, the control logic/intelligence 312 may send a command, via wireless transmission 109, to capture module 205 to re-capture a particular channel or some or all of the set of assigned, subscribed, or available current channels. After re-capturing the channels, the process may continue to measure the signal strengths, comparing the measured signal strengths to stored, predefined signal strengths, and adjust the antenna 102, once or iteratively until predetermined acceptable strengths are attained. Thus, in accordance with embodiment herein, the position of the antenna, the result of the needed rotation, results in the maximum number of channels at the best quality possible for each channel.

In accordance with embodiments herein, even when end user is not watching television, the intelligence of the innovation, based on the user's watching patterns and favorites channels, causes the antenna to adjust itself and store the data, so that when the user chooses to watch the next day or another day in the future, the favorite channels care captured with the best signal strength as compared to user-configured or firmware-configured, stored, and acceptable channel strengths.

In an embodiment, the innovation may store user profiles for a set of users (e.g., in storage unit 314). Then, the AI/ML algorithms may analyze and learn the viewing patterns related to the profiles and, subsequently attain the optimal signal strengths of the aggregate of channels from the aggregate of the profiles. For example, the innovation may learn that the mother likes to watch NBC in the morning and the father likes to watch CBS in the morning. Thus, the innovation adjusts the antenna(s) to obtain the best quality signals for such channels in the morning. In an embodiment, multiple antennas (e.g., 102) are installed on a facility. One antenna may correspond to the viewership patterns or preferences of one profile, e.g., that of the mother. Another antenna may correspond to the viewership patterns or preferences of another profile, e.g., that of the father.

In an embodiment, the innovation includes the antenna adjusting itself (e.g., via processes described herein) based on a particular recording schedule. For example, the recording schedule may be initialized from user input 319 via the remote control device 320 and stored in storage unit 314. Then, at an appropriate time before the recording (e.g., a three minutes before or ten seconds before), control logic/intelligence module 312 sends a command to OTA receiver 110 intended for the antenna control module 215 to adjust the antenna 102 to obtain the optimal quality signals possible for the channel associated with the scheduled recording.

An embodiment can be understood with reference to FIG. 4, a flow diagram showing a method for a smart OTA antenna to adjust itself. The method 400 may be performed by an OTA receiver, such as the OTA receiver 110 of FIG. 1. The OTA receiver may be a component of the receiving antenna, a component of a receiving device, or a standalone device(s).

At step 402, the method 400 includes capturing (e.g., by capture module 205) one or more over the air (OTA) channels, each OTA channel being associated with a broadcast frequency within an OTA frequency spectrum.

At step 404, the method 400 includes measuring (e.g., by OTA processor and storage 220 or control logic/intelligence 312) the channel strengths of the one or more OTA channels.

At step 406, the method 400 includes comparing (e.g., by OTA processor and storage 220 or control logic/intelligence 312) the measured channel signal strengths to predetermined, minimum channel signal strengths (e.g., stored in OTA processor and storage 220 or storage unit 314).

At step 408, the method 400 includes detecting (e.g., by OTA processor and storage 220 or control logic/intelligence 312) that one measured channel signal strength is below the predetermined minimum strength.

At step 410, the method 400 includes iteratively re-adjusting the OTA antenna 102 (e.g., by sending a command to antenna control 215 to change the position or angle of the OTA antenna by a predetermined amount), re-capturing (e.g., by capture module 205), re-measuring (e.g., by OTA processor and storage 220 or control logic/intelligence 312), and re-comparing (e.g., by OTA processor and storage 220 or control logic/intelligence 312), until the channel signal strength is at or higher than the predetermined minimum strength.

At step 412, the method 400 includes transmitting (e.g., by wireless transmission 109, coaxial feed 113, and/or from rendering module 322 to presentation device 310) the final, re-captured channel to a receiving device (e.g., presentation device 310) for presentation.

An embodiment can be understood with reference to FIG. 5, a flow diagram 500 showing smart OTA pre-positioning and/or redirection based on either anticipated or observed events, in accordance with an embodiment. More specifically, the innovation includes smart OTA redirection without the capture, measurement, detection of a power signal by the OTA itself. Rather, the innovation provides logical, smart pre-positioning based on either anticipated or observed events (e.g., viewing preferences, recording timers, etc.). For example, the AI/ML module (e.g., OTA processor and storage 220 or control logic/intelligence 312) may determine or compute that a date and time has arrived for which to request the OTA antenna (e.g., OTA antenna 102) to move to a specific position and/or direction. It should be appreciated that the AI/ML module may have computed the specific position and/or directed based on output from its algorithm that learns that a particular channel is anticipated to be watched at a certain day of the week and time of day. Also, the algorithm may output a learned, optimal positioning of the OTA antenna. For example, the AI/ML module may learn that a specific news channel is watched weekdays at 4 pm local time and that the OTA antenna is typically positioned in a specific position (within acceptable margins of error). Thus, the AI/ML may output these learned data. Further, the processor (e.g., OTA processor and storage 220 or control logic/intelligence 312) may be configured to monitor such output from the AI/ML module, or may be configured by another means, to send a command via the antenna control module (e.g., antenna control 215) to reposition the OTA antenna (e.g., OTA antenna 102) using OTA antenna positioning data output by the AI/ML module or OTA antenna positioning parameters previously stored within the OTA processor and storage 220 or storage unit 314.

As another example, the OTA processor (e.g., OTA processor and storage 220 or control logic/intelligence 312) may be configured to receive an event (e.g., related to data from user input 319), or generate an event (e.g., a wakeup call), that may cause the OTA processor to issue a command (e.g., to antenna control 215) to adjust the OTA antenna (e.g., OTA antenna 215). For example, a timer event may be received, the timer event indicating that a recording of a show, on a particular channel, and at a particular day and time is to occur. In response to receiving the timer event, or being configured to recognize a timer event, the OTA processor (e.g., OTA processor and storage 220 or control logic/intelligence 312) may go to a lookup table using data from the timer event to determine a corresponding position of the OTA antenna. For instance, if the timer event indicates that a news program on a specific channel at 4 pm that day is to be recorded, and the timer event is within a predetermined time range before the start of the news program (e.g., 90 seconds before the news program begins), then, in response to receiving such timer event and going to the lookup table, the OTA processor may send a command, with data about the corresponding antenna position, to antenna control 215 to position the OTA antenna accordingly, based on the corresponding antenna position data.

Thus, with reference to FIG. 5, at step 502, a processor (e.g., OTA processor and storage 220 or control logic/intelligence 312) determines that an anticipated viewing event is to occur or receives a notice that a viewing event is to occur. At step 504, based on data corresponding to the event, (e.g., channel, day, and time of day) determine (e.g., by OTA processor and storage 220 or control logic/intelligence 312) a corresponding optimal position of the OTA antenna. For example, such optimal position of the OTA antenna may have been previously stored in a storage (e.g., OTA processor and storage 220 or storage unit 314) or may have been computed in near real time by the AI/ML processor (e.g., residing in OTA processor and storage 220 or control logic/intelligence 312) based on learned and/or trained data. At step 506, a processor (e.g., OTA processor and storage 220 or control logic/intelligence 312) then sends a command to the antenna control processor (e.g., antenna control 215) to adjust the OTA antenna (e.g., OTA antenna 102) to the corresponding optional position of the OTA antenna. Optionally, at step 508, an iterative process may be performed, as follows: (re-)adjusting the OTA antenna, re-capturing the channel signal, re-measuring the signal strength, and re-comparing the signal strength with a threshold or stored, minimum strength value, until the channel signal strength is at or higher than the predetermined minimum strength. At step 510, after the OTA antenna has been adjusted to the optimal position, capturing and transmitting the final channel to a receiving device for presentation.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that many functions and/or operations within such block diagrams (e.g., the functions of the stream packer or stream packing apparatus), flowcharts, or examples can be implemented, individually and/or collectively, by a wide range of hardware, software, firmware, or virtually any combination thereof and that designing the circuitry and/or writing the code for the software and/or firmware would be well within the skill of one of ordinary skill in the art in light of the teachings of this disclosure. For example, the functions of the stream packer could be implemented in discrete logic with no central processing unit (CPU) or software involvement.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the control logic 312), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method, comprising:

capturing, by an over the air (OTA) antenna of an OTA antenna system configured to receive OTA signals within an OTA frequency spectrum, OTA digital video signals corresponding to a plurality of OTA channels, each OTA channel being associated with a pre-determined broadcast frequency within the OTA frequency spectrum and carrying a content, wherein the OTA antenna system is positioned in or on a building and is communicably connected to a television or set-top-box;

measuring individual channel signal strengths of the captured OTA digital video signals corresponding to a subset of OTA channels of the plurality of OTA channels, each of the individual channel signal strengths of the subset of OTA channels being indicative of reception quality of the corresponding content stream;

comparing, for each of the subset of OTA channels, the measured channel signal strength to a corresponding predetermined minimum channel signal strength;

detecting a measured channel signal strength, of the measured channel signal strengths, that is lower than a predetermined minimum channel signal strength, of the corresponding predetermined minimum channel signal strengths, for a first OTA channel of the subset of OTA channels, the first OTA channel being associated with a first pre-determined broadcast frequency within the OTA frequency spectrum and carrying a first content stream;

responsive to said detecting that the measured channel signal strength of the first OTA channel is lower than the predetermined minimum channel signal strength, autonomously determining, by the OTA antenna system, an adjustment command to adjust the OTA antenna by iteratively:

causing the OTA antenna to automatically adjust its placement by adjusting at least one of a position of the OTA antenna, an angle of the OTA antenna, or a direction of the OTA antenna, recapturing an OTA digital video signal corresponding to the first OTA channel associated with the first pre-determined broadcast frequency, remeasuring a channel signal strength of the recaptured OTA digital video signal corresponding to the first OTA channel associated with the first pre-determined broadcast frequency, the channel signal strength of the first OTA channel being indicative of reception quality of the first content stream, and comparing the remeasured channel signal strength, until the remeasured channel signal strength is greater than or equal to the predetermined minimum channel signal strength; and transmitting the recaptured OTA digital video signal corresponding to the first content stream carried by the first OTA channel to the television or set-top-box.

2. The method of claim 1, wherein the capturing, measuring, detecting, and automatically adjusting the placement of the OTA antenna is performed on a predetermined, periodic basis.

3. The method of claim 1, further comprising:

receiving a control command, originating from an artificial intelligence (AI) or machine learning (ML) component, to automatically adjust the placement of the OTA antenna, the control command based on learned user viewership patterns by the AI or ML component.

4. The method of claim 3, wherein user viewership patterns include specific channels viewed, a time of day viewed for each of the specific channels, and a duration viewed for each of the specific channels.

5. A non-transitory computer-readable storage medium storing computer-readable instructions, comprising:

instructions for capturing, by an over the air (OTA) antenna of an OTA antenna system configured to receive OTA signals within an OTA frequency spectrum, OTA digital video signals corresponding to a plurality of OTA channels, each OTA channel being associated with a pre-determined broadcast frequency within the OTA frequency spectrum and carrying a content stream, wherein the OTA antenna system is configured to be positioned in or on a building and is communicably connected to a television or set-top-box;

instructions for measuring individual channel signal strengths of the captured OTA digital video signals corresponding to a subset of OTA channels of the plurality of OTA channels, each of the individual channel signal strengths of the subset of OTA channels being indicative of reception quality of the corresponding content stream;

instructions for comparing, for each of the subset of OTA channels, the measured channel signal strength to a corresponding predetermined minimum channel signal strength;

instructions for detecting a measured channel signal strength, of the measured channel signal strengths, that is lower than a predetermined minimum channel signal strength, of the corresponding predetermined minimum channel signal strengths, for a first OTA channel of the subset of OTA channels, the first OTA channel being associated with a first pre-determined broadcast frequency within the OTA frequency spectrum and carrying a first content stream;

instructions for: responsive to said detecting that the measured channel signal strength of the first OTA channel is lower than the predetermined minimum channel signal strength, autonomously determining, by the OTA antenna system, an adjustment command to adjust the OTA antenna by iteratively:

causing the OTA antenna to automatically adjust its placement by adjusting at least one of a position of the OTA antenna, an angle of the OTA antenna, or a direction of the OTA antenna, recapturing an OTA digital video signal corresponding to the first OTA channel associated with the first pre-determined broadcast frequency, remeasuring a channel signal strength of the recaptured OTA digital video signal corresponding to the first OTA channel associated with the first pre-determined broadcast frequency, the channel signal strength of the first OTA channel being indicative of reception quality of the first content stream, and comparing the remeasured channel signal strength, until the remeasured channel signal strength is greater than or equal to the predetermined minimum channel signal strength; and instructions for transmitting the recaptured OTA digital video signal corresponding to the first content stream carried by the first OTA channel to the television or set-top-box.

6. The non-transitory computer-readable storage medium of claim 5, wherein the instructions for capturing, measuring, detecting, and automatically adjusting the placement of the OTA antenna include instructions to be performed on a predetermined, periodic basis.

7. The non-transitory computer-readable storage medium of claim 5, further comprising:

instructions for receiving a control command, originating from an artificial intelligence (AI) or machine learning (ML) component, to automatically adjust the placement of the OTA antenna, the control command based on learned user viewership patterns by the AI or ML component.

8. The non-transitory computer-readable storage medium of claim 7, wherein user viewership patterns include specific channels viewed, a time of day viewed for each of the specific channels, and a duration viewed for each of the specific channels.

9. The non-transitory computer-readable storage medium of claim 5, wherein the subset of OTA channels comprise a set of preferred channels, the non-transitory computer-readable storage medium further comprising:

instructions for receiving the set of preferred channels provided by an end user and causing the OTA antenna to automatically adjust its placement to capture an OTA digital video signal corresponding to each of said preferred channels with a measured signal strength above the predetermined minimum channel signal strength.

10. A smart over the air (OTA) antenna system, comprising:

an over the air (OTA) antenna, wherein the OTA antenna system is configured to be positioned in or on a building and is communicably connected to a television or set-top-box;

a capturing module configured to capture, by the OTA antenna configured to receive OTA signals within an OTA frequency spectrum, OTA digital video signals corresponding to a plurality of over the air (OTA) channels, each OTA channel being associated with a pre-determined broadcast frequency within the OTA frequency spectrum and carrying a content stream;

an intelligence processor configured to measure individual channel signal strengths of the captured OTA digital video signals corresponding to a subset of OTA channels of the plurality of OTA channels, each of the individual channel signal strengths of the subset of OTA channels being indicative of reception quality of the corresponding content stream;

the intelligence processor further configured to compare, for each of the subset of OTA channels, the measured channel signal strength to a corresponding predetermined minimum channel signal strength;

the intelligence processor further configured to detect a measured channel signal strength, of the measured channel signal strengths, that is lower than a predetermined minimum channel signal strength, of the corresponding predetermined minimum channel signal strengths, for a first OTA channel of the subset of OTA channels, the first OTA channel being associated with a first pre-determined broadcast frequency within the OTA frequency spectrum and carrying a first content stream;

the intelligence processor further configured to, responsive to said detecting that the measured channel signal strength of the first OTA channel is lower than the predetermined minimum channel signal strength, autonomously determine an adjustment command to adjust the OTA antenna by iteratively: sending a command to an antenna control module to cause it to automatically adjust placement of the OTA antenna by adjusting at least one of a position of the OTA antenna, an angle of the OTA antenna, or a direction of the OTA antenna; causing the capturing module to recapture an OTA digital video signal corresponding to the first OTA channel associated with the first pre-determined broadcast frequency; remeasuring a channel signal strength of the recaptured OTA digital video signal corresponding to the first OTA channel associated with the first pre-determined broadcast frequency, the channel signal strength of the first OTA channel being indicative of reception quality of the first content stream; and comparing the remeasured channel signal strength, until the remeasured channel signal strength is greater than or equal to the predetermined minimum channel signal strength; and the intelligence processor further configured to transmit the recaptured OTA digital video signal corresponding to the first content stream carried by the first OTA channel to the television or set-top-box.

11. The smart over the air (OTA) antenna system of claim 10, wherein the capturing, measuring, detecting, and automatically adjusting the placement of the OTA antenna is performed on a predetermined, periodic basis.

12. The smart over the air (OTA) antenna system of claim 10, further comprising:

a receiving processor for receiving a control command, originating from an artificial intelligence (AI) or machine learning (ML) component, to automatically adjust the placement of the OTA antenna, the control command based on learned user viewership patterns by the AI or ML component.

13. The smart over the air (OTA) antenna system of claim 12, wherein user viewership patterns include specific channels viewed, a time of day viewed, and a duration of time viewed.

14. The smart over the air (OTA) antenna system of claim 10, further comprising: a receiving processor for receiving a forced scan command, the forced scan command causing:

the capturing module to capture OTA digital video signals corresponding to the subset of OTA channels;

the intelligence processor to measure channel signal strengths of the captured OTA digital video signals corresponding to the subset of OTA channels;

the intelligence processor to compare, for each of the subset of OTA channels, the measured channel signal strength to the corresponding predetermined minimum channel signal strength;

the intelligence processor to detect a measured channel signal strength, of the measured channel signal strengths, that is lower than a predetermined minimum channel signal strength, of the corresponding predetermined minimum channel signal strengths, for at least one OTA channel of the subset of OTA channels;

the intelligence processor to, responsive to said detecting that the measured channel signal strength is lower than the predetermined minimum channel signal strength, iteratively:

send a command to an antenna control module to cause it to automatically adjust placement of the OTA antenna;

cause the capturing module to recapture an OTA digital video signal corresponding to the at least one OTA channel;

remeasure the recaptured OTA digital video signal corresponding to the at least one OTA channel; and compare the remeasured channel signal strength, until the remeasured channel signal strength is greater than or equal to the predetermined minimum channel signal strength; and the intelligence processor to transmit the recaptured OTA digital video signal corresponding to the at least one OTA channel to the television or set-top-box.

15. The smart over the air (OTA) antenna system of claim 10, wherein the subset of OTA channels comprise a set of preferred channels, the system further comprising:

a mechanism for an end user to assign the set of preferred channels, causing the OTA antenna to automatically adjust its placement to capture an OTA digital video signal corresponding to each of said preferred channels with a measured signal strength above the predetermined minimum channel signal strength.

16. A method, comprising:

receiving a control command, originated from an artificial intelligence (AI) or machine learning (ML) component, to automatically adjust an OTA antenna of an OTA antenna system configured to receive OTA digital video signals within an OTA frequency spectrum, the OTA digital video signals corresponding to a plurality of over the air (OTA) channels, each OTA channel being associated with a pre-determined broadcast frequency within the OTA frequency spectrum and carrying a content stream, the control command based on learned user viewership patterns by the AI or ML component, wherein the OTA antenna system is positioned in or on a building and is communicably connected to a television or set-top-box;

causing the OTA antenna to automatically adjust itself based on the control command to an OTA antenna placement;

obtaining, from the AI or ML component, a subset OTA channels of the plurality of OTA channels;

measuring a channel signal strength of an OTA digital video signal corresponding to a first OTA channel of the subset of OTA channels corresponding to the OTA antenna placement, the first OTA channel being associated with a first pre-determined broadcast frequency within the OTA frequency spectrum and carrying a first content stream, and the channel signal strength of the first OTA channel being indicative of reception quality of the first content stream;

detecting the measured channel signal strength is lower than a predetermined minimum channel signal strength;

responsive to detecting the measured channel signal strength is lower than the predetermined minimum channel signal strength, autonomously determining, by the OTA antenna system, an adjustment command to cause the OTA antenna to automatically adjust its placement by adjusting at least one of a position of the OTA antenna, an angle of the OTA antenna, or a direction of the OTA antenna; and capturing and transmitting an OTA digital video signal corresponding to the first content stream carried by the first OTA channel to a receiving device for presentation, wherein the receiving device is the television or the set-top-box.

17. The method of claim 1, wherein the subset of OTA channels comprise a set of preferred channels, the method further comprising:

receiving the set of preferred channels and causing the OTA antenna to automatically adjust its placement to capture an OTA digital video signal corresponding to each of said preferred channels with a measured signal strength above the predetermined minimum channel signal strength.

* * * * *